United States Patent [19]

Dunn et al.

[11] Patent Number: 5,822,543
[45] Date of Patent: Oct. 13, 1998

[54] GATHERING DATA HANDLING STATISTICS IN NON-SYNCHRONOUS DATA COMMUNICATION NETWORKS

[75] Inventors: James Michael Dunn, Ocean Ridge; Edith Helen Stern, Boca Raton, both of Fla.; Barry Willner, Briarcliff Manor, N.Y.

[73] Assignee: International Business Machines Corporation, Armonk, N.Y.

[21] Appl. No.: 677,675

[22] Filed: Jul. 8, 1996

[51] Int. Cl.$^6$ .............................. G06F 13/42; G06F 15/17; H04J 12/28

[52] U.S. Cl. ............................... 395/200.54; 395/200.65; 395/200.61; 370/252

[58] Field of Search .................... 395/200.54, 200.65, 395/200.71, 200.78, 185.08, 200.61, 200.32; 370/232, 252, 508, 233, 234, 236, 253, 519

[56] References Cited

U.S. PATENT DOCUMENTS

| | | |
|---|---|---|
| 4,905,171 | 2/1990 | Kiel et al. . |
| 5,081,680 | 1/1992 | Bennett . |
| 5,131,848 | 7/1992 | Adams . |
| 5,163,054 | 11/1992 | Nagy ................................... 395/200.61 |
| 5,293,463 | 3/1994 | Masuda . |
| 5,446,733 | 8/1995 | Tsuruoka . |
| 5,457,806 | 10/1995 | Kitamura . |
| 5,550,807 | 8/1996 | Kuroshita ................................ 370/252 |
| 5,602,992 | 2/1997 | Danneels ............................ 395/200.78 |
| 5,668,800 | 9/1997 | Stevenson ................................ 370/252 |
| 5,696,904 | 12/1997 | Hashimoto et al. ................. 395/200.54 |
| 5,699,511 | 12/1997 | Porcaro et al. ...................... 395/185.08 |
| 5,712,982 | 1/1998 | Marcel ................................ 395/200.61 |

OTHER PUBLICATIONS

IBM Technical Disclosure Bulletin; Realtime Throughput Measurement, vol. 26, No. 10B, Mar. 1984, pp. 5688–5698.
IBM Technical Disclosure Bulletin; General Purpose Data Collection Method, vol. 16, No. 6, Nov. 1973, pp. 1796–1798.
IBM Technical Disclosure Bulletin; Serial Channel Utilization Distribution, vol. 22, No. 1, Jun. 1979, pp. 245–247.
IBM Technical Disclosure Bulletin; Network Monitor, vol. 25, No. 2, Jul. 1982, pp. 543–547.

*Primary Examiner*—Mark H. Rinehart
*Attorney, Agent, or Firm*—Richard A. Tomlin; Robert Lieber

[57] ABSTRACT

Disclosed apparatus and method enable a host computer or server in a non-synchronous data communication network—e.g. a network in which data is subject to routing over transmission paths of indefinite configurations and lengths, and receptive handling of indefinite duration—to gather time statistics from client computers or terminals receiving the data; particularly statistics useful for determining: (a) transit times of data from server to clients; (b) times elapsed at client stations, between reception of data and one or more events pre-specified in information accompanying the data; and (c) transit times of return messages sent from respective client stations to the server. Control information attached to transmitted data includes a "timing script" written in a scripted language subject to interpretation by software at the client station receiving the data. In addition to the timing script, other information presently attached to transmitted data includes an identity ("data ID") value uniquely associated with the transmitted data, and a starting time value $ST_0$ representing the time at which transmission of the data started. The timing script causes a computer or intelligent terminal at the client station to start a local timer, and send two or more return messages back to the originating server. Each return message contains the data ID and time information. A first return message (MSG1), sent immediately upon reception of the data, includes the start time $ST_0$. One or more second messages (MSG2) sent conditionally after the first message indicate times elapsed between reception of the data and one or more user handling events effectively pre-specified in the timing script.

8 Claims, 3 Drawing Sheets

GATHERING DATA HANDLING STATISTICS IN NON-SYNCHRONOUS DATA COMMUNICATION NETWORKS

FIELD OF THE INVENTION

This invention concerns a method and apparatus for gathering timing statistics in non-synchronous data communication networks; particularly statistics pertaining to data transmission times and reaction times of users at receiving stations.

BACKGROUND OF THE INVENTION

The term "non-synchronous data communication networks", as used herein, is meant to connote networks in which internal clocks of sending and receiving stations are essentially not synchronizable. Typical examples of such networks are the Internet and World Wide Web; wherein transmitted data may be subject to indefinite delays due to varied routing (depending upon traffic conditions) and due to conditions encountered at individual switching nodes in any route (depending upon traffic conditions and operating speed of equipment at respective nodes). Accordingly, such networks do not lend themselves easily to gathering of timing statistics indicative of transmission time delays between sending and receiving stations. Even assuming that receiving stations send notifications of reception to origin/sending stations, such notifications would necessarily arrive at indefinite times due to indeterminate delays caused by routing and other conditions (like those encountered by transmitted data).

Furthermore, at receiving stations in such networks, the timing of user reactions to received data is generally indefinite, and, assuming receiving stations send notifications of such reaction times to origin/sending stations, times at which such notifications arrive at sending stations are necessarily indefinite due to network delays of the same type as those encountered by transmitted data.

Nevertheless, statistics indicative of data transmission times over the network and user reaction times at receiving stations may be very useful for enabling data senders to evaluate their communication needs and the effectiveness of their transmitted data. This is particularly true of public networks like the Internet, in which transmitted data may have commercial or advertising significance.

It is generally known that in such networks transmission delays are not measurable or inferrable simply from acknowledgements returned by receiving stations; inasmuch as transmitted data would encounter indeterminate routing and/or switching delays, and corresponding acknowledgements would also encounter indeterminate routing and/or switching delays generally different from those encountered by associated transmitted data. Similarly, it is understood that timing of user reactions to transmitted data, at receiving stations, is not inferrable simply from returned acknowledgements or equivalent signals inasmuch as such reaction times per se have indefinite timing relative to instants of reception and return transmissions of acknowledgements would be subject to indeterminate delays due to the network construction.

Nevertheless, information about data transmission delays, and delays in respect to user reactions to transmitted data at receiving stations, could be quite useful. For instance, the sender of an advertisement might want to know how long it took for the advertisement to reach the average receiver, and what interest is generated by the received advertisement or even specific portions thereof. Knowledge of the average transmission delay could enable senders to evaluate their communication needs and upgrade or downgrade accordingly. Similarly, knowledge of how times elapsed on average between reception of advertisements and actions indicating user interest (or even disinterest) therein could enable senders to evaluate the effectiveness of such advertisements.

In general then, for data representing various displayable offerings, advertisements, or the like, time statistics indicative of transmission delays and reactions to the received data could be of interest to senders; at least as a means for evaluating the effectiveness of transmission facilities currently being utilized and effectiveness of the data per se.

SUMMARY OF THE INVENTION

In accordance with the invention, means located at server and client nodes of a data communication network—particularly, a network in which data is subject to being transmitted over varied routes depending upon time of day, traffic, class of service, etc.—enable a computer at the server node, when transmitting data to a computer or "intelligent" terminal at the client node, to receive feedback messages from the client node containing timing useful timing statistics. More specifically, timing statistics provided in the feedback messages are useful for indicating the types and frequencies of transmission delays that are attributable to network routing, as well as indicating user reactions to transmitted data at client terminals. Thus, the owner of the transmitted data can use such statistics to determine if their network service has to be upgraded, to select optimal times of day for transmitting their data, to determine the effectiveness of the data per se in respect to those viewing the data at client stations, etc.

To induce actions at client stations resulting in return of such feedback messages, a "timing script" is incorporated into the data transmitted to each client station. This script is interpretable by an interpreter operating at the client station. For instance, on the Internet, the timing script could be written in the script language associated with the Java™ programming language (Java is a Trademark of Sun Microsystems) commonly used in Internet communications, and at the client station the timing script could be interpreted by a Java interpreter of the type commonly provided in so-called "web browsers" like Netscape's "Navigator". It should be understood that elements of the Java language are cited here only as examples; and that other script languages and their interpreters could be used for the same purpose of inducing message feedback actions.

In addition to the foregoing timing script, information added to the transmitted data (at the server) includes a "data ID" term uniquely associated to the data being transmitted, and a starting time value $ST_0$ representing the time at which transmission of the associated data began (based on the state of the server's internal clock).

On receipt of the data at a client station, the timing script acts as instructions to the client's interpreter program causing the latter to: (a) immediately return a first message ("MSG1") to the server, and (b) start a client timer ("CT") to effectively measure elapsed time from reception of the data to one or more events specified in the timing script. MSG1 includes $ST_0$ and the data ID.

On receiving MSG1, the server creates a current time stamp $ST_1$, calculates the difference between $ST_1$ and $ST_0$, and saves the result in association with the data ID as a measure of "round-trip transmission time" taken for transfer of the data and return of MSG1. The saved result is useful for further analysis of the effectiveness of network access services then being received by the data sender. Furthermore, if MSG1 is accompanied by address information indicating the routing of that message, such address information could also be saved and used by the sender for evaluating the transmission time taken for sending the original data as well as the effectiveness of network services then being used by the sender.

Upon occurrence of a said specified event, the client computer: (a) extracts the then instantaneous value of its timer count CT as a representation "ET" of the time elapsed between receipt of the data and occurrence of the respective event; and (b) sends a second message, MSG2, to the server, this message containing the value of ET as well as the data ID and $ST_0$. On receiving MSG2, the server creates a current time stamp $ST_2$, calculates the difference between $ST_2$ and $ST_0$, and saves the result along with the value of ET, in association with the data ID, for further analysis. This second saved result is indicative of the aggregate time taken for transmission of the data, client handling of the data up to the respective event, and return transmission of MSG2; i.e. it is indicative of the aggregate round trip transmission times of the data and MSG2 plus the elapsed time ET from client reception of the data to the aforesaid event. Incidentally, it should be noted that elapsed time between transmission of the data and multiple events, the latter representing various reactions of a viewer to the transmitted data, could be determined in this manner by having the client station return additional messages MSG3, MSG4, etc.

Upon subtraction of ET from the above second result, the remainder is a useful indication of aggregate round trip transmission times for the data and MSG2. Also, comparison of that remainder with the "round trip" time derived from MSG1 may provide useful insights as to differences in return transmission routes allocated to MSG1 and MSG2. The average of these differences in return routing can be subtracted from the remainder to arrive at a reasonable measure of the transmission time of the originally sent data; i.e. as a measure of the effectiveness of network service provided for that transmission. The saved value of ET, and other values of ET derived from other feedback messages—e.g. from messages responsive to other events at the same client and/or from messages generated by other clients receiving the same data—can be used to provide the data owner (e.g. advertiser) with information indicative of various reactions to the data of end users at client stations e.g. information that could be used to evaluate the effectiveness of data constituting different advertisements of a product as an aid in selection of a most effective advertisement.

These and other features, advantages, objectives and benefits of the present invention will be more fully understood by considering the following detailed description and claims.

DETAILED DESCRIPTION

1. Problems Solved By The Present Invention

A network environment in which the invention can be used to advantage is suggested in FIG. 1, and problems pertaining to gathering of delay timing statistics in such networks are explained with reference to FIG. 1 and a timing diagram in FIG. 2.

Figure 1:
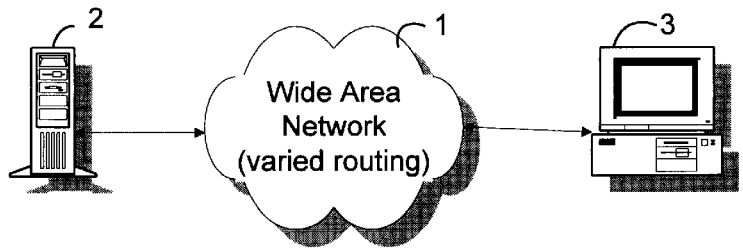
FIG. 1 is a schematic illustrating an aspect of problems dealt with presently in respect to gathering information about network delays encountered by transmitted data in non-synchronous data communication networks wherein data is subject to indefinite routing and switching delays.

FIG. 1 shows a wide area non-synchronous data communication network 1 linking server 2 to client computer 3. It is understood that in addition to the stations containing server 2 and client system 3 the network shown may serve many other stations, both servers and clients. A presently relevant characteristic of such networks is that data is subject to indeterminate transmission delays due to either or both of: varied routing of the data (through switching equipment variably located in the network) and/or conditions encountered at network switching nodes. Such delays are necessitated by traffic volume and other circumstances both throughout the network and at individual switching nodes. Consequently, data transmitted from server 2 to client station 3 would encounter indeterminate or indefinite delays in such transmission, depending upon the number of switching nodes traversed by the data, cumulative distances between traversed switching nodes, conditions encountered within individual switching nodes (traffic conditions, operating speed of switch equipment, etc.), etc. The Internet and World Wide Web represent typical networks of this type.

Another pertinent characteristic of this type of network is that signals returned from stations receiving data to stations sending the data (e.g. from station 3 to server 1 in the illustration of FIG. 1) encounter indeterminate or indefinite network delays in their transfers that further complicate the problem of gathering or inferring timing statistics.

Figure 2:
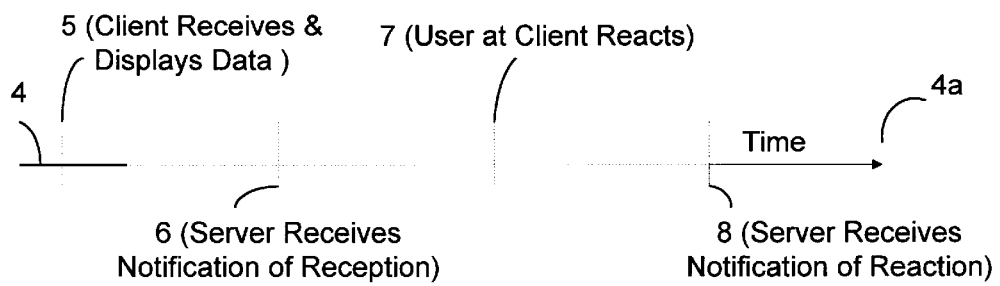
FIG. 2 illustrates other aspects of problems dealt with presently in respect to gathering information about network delays encountered by transmitted data based on signals returned from receiving stations as soon as the latter receive the data, and about delays in timing of user reactions to the transmitted data, at receiving stations, based on other sign sent when such reactions occur.

Referring to the timing diagram in FIG. 2, line 4 denotes time and the direction of increasing time is suggested by the arrow indicated at 4a. Broken portions of line 4 represent time intervals of indefinite or indeterminate duration.

A first time of present interest in this figure, that indicated at 5, is the time of reception of transmitted data (e.g. in FIG. 1, data received by client 3 from server 2). As noted in the discussion of FIG. 1, this time is indeterminate due to network delays that depend on network routing conditions and/or queueing delays at network switching nodes.

Now, assuming that a signal or message effectively acknowledging reception is returned from a station receiving data to the data's origin station (e.g. from client 3 to server 2 in FIG. 1), a second time of present interest would be the time elapsed between the transmission of that (acknowledging) signal or message and its arrival at its destination; i.e. the time elapsed between time points 5 and 6 in FIG. 2. As indicated by the broken line between times 5 and 6, this arrival time is also indefinite or indeterminate as suggested by the broken line between time points 5 and 6).

A third time of present interest is that elapsed between time points 5 and 7, FIG. 2. This is the elapsed time between reception of data and occurrence of a predetermined user reaction to all or part of that data; e.g. could be one of: discarding a viewable page of data evoked by a user action calling for loading of new data, selection of a particular term or symbol, in a viewable page, that effectively constitutes a "hyperlink" for initiating a predetermined communication to the origin data server, sending of a reply to data constituting an E-Mail note, etc.). As indicated by the dotted line between time points 5 and 7, this elapsed time also is of indeterminate or indefinite duration inasmuch as it depends upon unpredictable behavior of a user/viewer of the data.

Finally, assuming that the client station sends a signal or message to the origin server at user reaction time 7 (that signal or message effectively constituting an acknowledgement of occurrence of the predetermined user reaction), a fourth time of present interest would be the time elapsed between transmission of this signal or message and its arrival at the origin server (the latter time shown at 8, FIG. 2). As indicated by the dotted line between times 7 and 8, this elapsed time is also of indeterminate or indefinite duration due e.g. to unpredictable network delays and/or unpredictable queueing (traffic) conditions at network switching nodes.

A point to note in respect to reception times 6 and 8 is that although FIG. 2 shows respective signals/messages reaching the server in the same order as they were sent, they could conceivably arrive in reverse order; inasmuch as they would in general traverse different routes through switching nodes of the network and/or different aggregate queueing delays in transit through such nodes. Thus, the signal representing notification of data reception could traverse a lengthier network route than the signal representing notification of user reaction, and thereby incur a lengthier transmission delay than the user reaction notification, and/or the former signal could incur encounters lengthier aggregate queueing delays than the latter signal in transit through switching nodes of respective routes.

In an environment like the Internet, representative transmitted data could be pages displayable at the receiving client station, and a typical user reaction that could be the subject of the above notification of reaction could be one of: filling in a particular item in a form displayed in a page, selection of a highlighted text term or symbol within a displayed page (such selection e.g. effecting a hyperlink request to have a related page downloaded from the origin server), or discarding the displayed page by requesting another unrelated page, etc. Also, it is generally understood that in an environment such as the Internet, sending and receiving stations have internal clocks that are neither synchronous to each other nor synchronizable as such; and this inability to synchronize clocks further complicates the gathering of presently relevant delay timing statistics.

Referring again to FIG. 2, and considering the indefiniteness or indeterminateness of elapsed times between times 5 and 6, times 5 and 7, and times 7 and 8, it is easy to understand why it is difficult in such networks to gather timing statistics indicative of such elapsed times and of transmission and user reaction delays related to such.

Nevertheless, such statistics could be quite useful. For example, a sender of Internet pages representing commercial offerings or advertisements, might want to know the average transmission delay encountered in transmittal of their pages, and/or times of specific user reactions to items contained in their pages. Knowledge of average transmission delays could enable the sender to determine if their network access facilities are adequate for intended purposes or need upgrading. Knowledge of user reactions to specific page items might enable senders to modify their offerings or advertisements to maximize user interest and ultimately increase associated sales.

The present invention provides means for enabling senders to gather such time statistics.

2. Preferred Embodiment of the Invention

The general attributes of the invention are described below with reference to FIG. 3, and specific server and client operations pertinent to the invention are described below with reference to flow diagrams contained in FIGS. 4 and 5.

Figure 3:
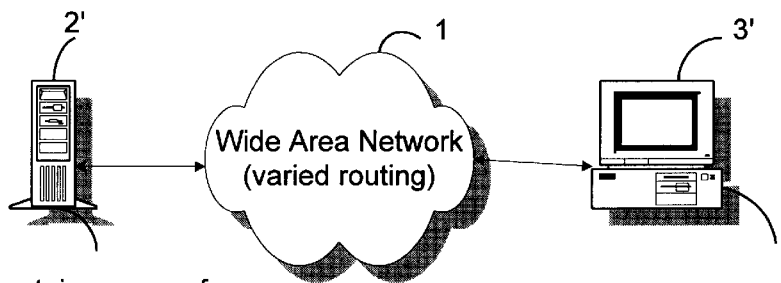
FIG. 3 is a block diagram of an embodiment of the present invention, and its deployment at server and client nodes of a network exemplified by the Internet.

As indicated in FIG. 3, server 2', adapted in accordance with the present invention, includes means for incorporating into (or attaching to) transmitted data certain control information; the latter including a unique data identity (ID) function, a transmission start time (hereafter denoted $ST_0$), and a "timing script" (discussed below) for inducing equipment at the receiving station to return messages containing statistically pertinent time information in a desired manner.

As indicated further in FIG. 3, client station 3', as presently adapted, contains means for interpreting the above-mentioned timing scripts and for transmitting certain return messages to servers that sent data to which respective timing scripts were attached.

The means mentioned above preferably are embodied in application programs installed at the server and client stations. The timing scripts mentioned above could be written in a script language, and the interpreter for the timing script could be contained in browser applications commonly installed at client stations. As noted earlier, a suitable script language for application of the invention to the Internet would be the script language associated with the Java™ (Trademark of Sun Microsystems) programming language, and a suitable corresponding interpreter facility for client stations could be a function that is presently available in a number of existing browser applications. For example, the Netscape Navigator™ (trademark of Netscape Corporation) is one such browser application.

Although transmission of scripted instructions is not new per se, functions evoked by the present timing script are considered novel. It should be noted that any script language and associated interpreter could be employed in the present manner. It also should be noted that it would be possible for a server to send timing scripts in any form that is likely to be interpreted at a client station (even, for instance, in multiple different script language forms tailored to different interpreters). Furthermore, users of the Internet will appreciate that script, such as that in the presently used timing script, and interpreters associated therewith, can be installed in computers at network stations (both client and server stations) in various forms; e.g. via computer readable media such as storage disks or via the network itself.

Pertinent operations of server and client stations in accordance with the invention are described next with reference to FIGS. 4 and 5.

Figure 4:
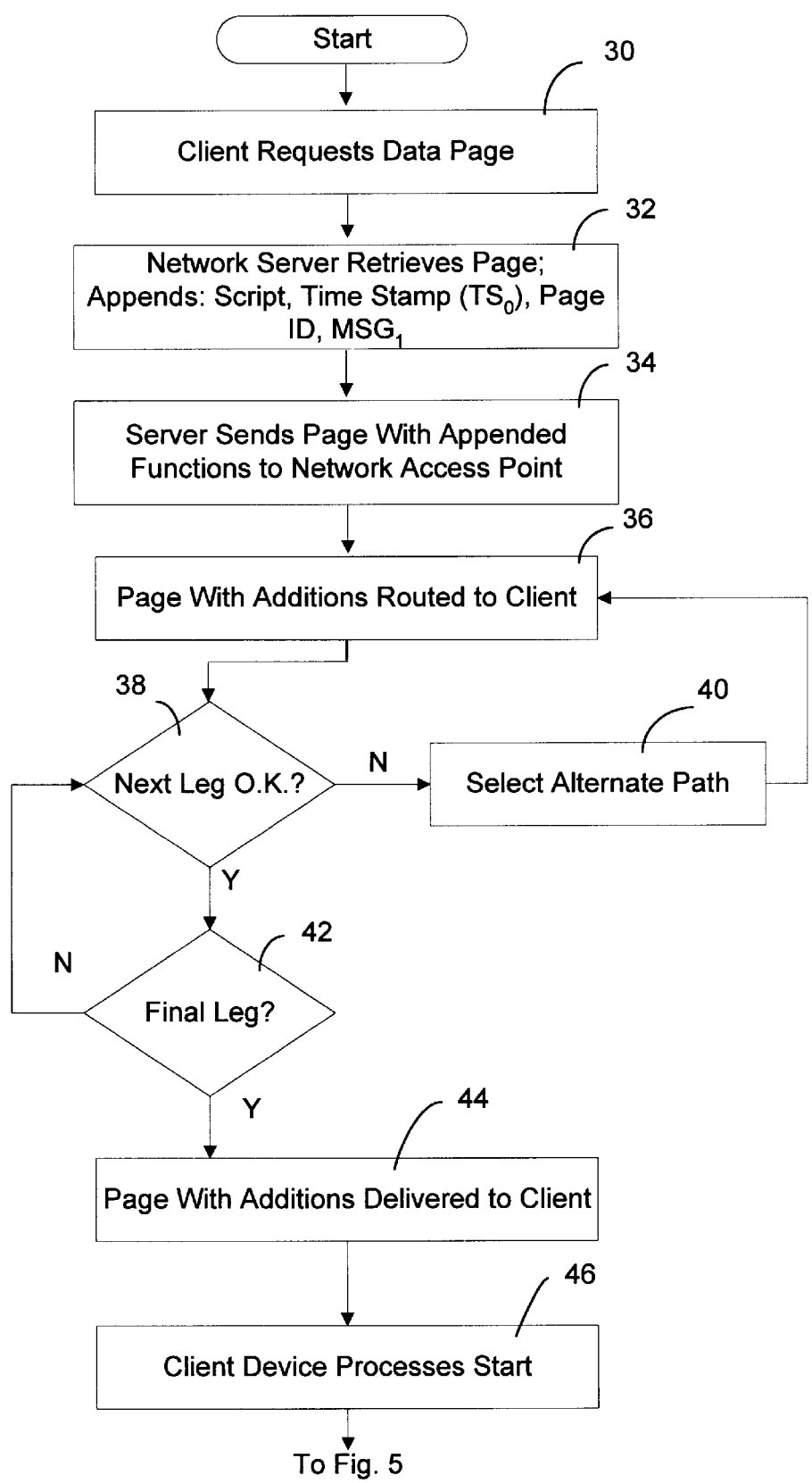
FIG. 4 is a flow diagram describing operations performed in accordance with the invention to effect transmission of data from a server station to a client station, in a form enabling the server station to gather time statistics pertaining to the time taken for the data to reach client station as well as other time statistics presently pertinent.
Figure 5:
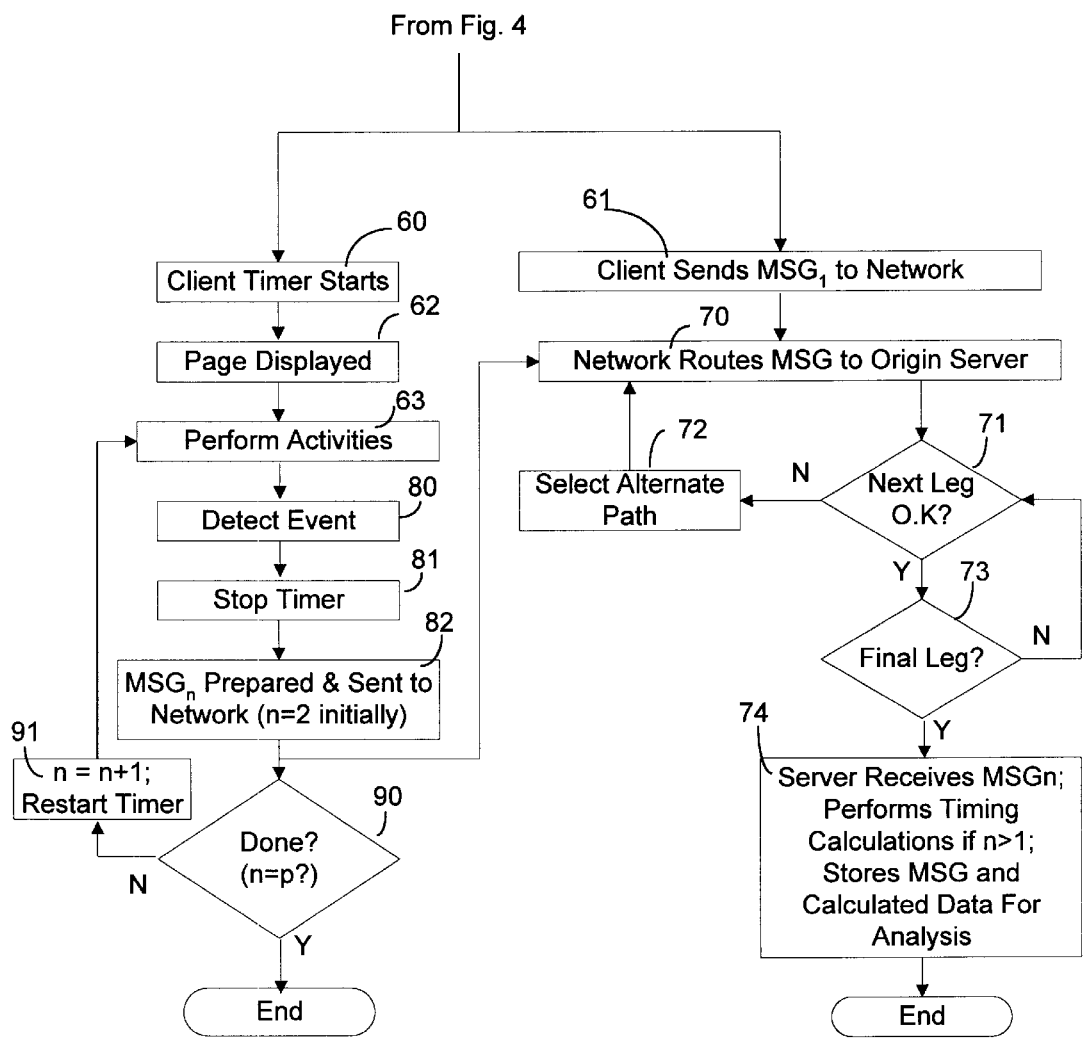
FIG. 5 is a flow diagram describing operations at client stations in respect to data received in the form indicated in FIG. 4, which operations result in return of messages to the server station from which presently pertinent time statistics can be calculated and saved at the client station.

FIG. 4 shows relevant processes performed at an Internet type server station, during retrieval and transmission of a data page requested by a client station. In response to reception of a page request from a client station (action 30, FIG. 4), the server retrieves the requested page and attaches certain information to it (actions 32, FIG. 4). The attached information includes a timing script, an initial time stamp designated $ST_0$, a page identity (ID), and a first return message designated $MSG_1$ (or instructions for generating such). $MSG_1$ may include the initial time stamp $ST_0$.

The page and attached information are sent to a network access point (action 34, FIG. 4) at which a route (or a portion of a route) is selected for transmitting the respective data and attachments to the requesting client. It is understood that such a route may consist of variably located switching nodes of the network (nodes at which data from many network sources is switchably handled relative to many network destinations).

Selection of the foregoing route is effected in the manner suggested at 36–42. In this process, partial route segments or legs are tested, and chosen or not chosen (operations 38 and 40) depending upon their instantaneous accessibility. Successive segments or legs are chosen in this manner until a complete route is formed from the initial access point to the requesting client. These tests and selections may all be made at the initial access point or distributively at that point and switching nodes between that point and the final destination. As shown at 38 and 40, if a tested leg is currently inaccessible or unavailable, an alternate leg is tried. As shown at 42, if the leg tested at 38 is available, an additional determination is made as to whether this leg is an intermediate route segment or a last one (i.e. one linking directly to the requesting client). If the determination at 42 is that the currently tested leg is intermediate, a next leg is tested as suggested by the line leading from the "N" (no) termination of 42 to the input of decision 38. If the determination at 42 is that the leg just tested is the last one of a route, the route selection is complete and the page with its additions is transferred over the route to the client station (operation 44).

As suggested at 46, upon receipt of the page and additions a number of device processes are initiated at the client station. Pertinent details of these processes are shown in FIG. 5.

At reception of the page with attached information, the attached timing script prompts computer apparatus at the client station to start an internal timer/clocked counter (operation 60) and concurrently to initiate transmission of $MSG_1$ to a network access point (operation 61). Concurrently, the received page is displayed at the client station (operation 62), assuming that its contents are displayable in a meaningful form, and viewable by a user at that station. What occurs thereafter at the client station depends at least in part upon actions taken by such a user in respect to the displayed page or a specific portion thereof (these activities represented at 63).

While these actions are occurring, a route for transferring $MSG_1$, from the network access point to the origin server (the server that sent the page now being displayed), is chosen by selection processes 70–73 similar to processes 36, 38, 40 and 42 of FIG. 2; and $MSG_1$ is transmitted to the origin server over that route. Upon receiving $MSG_1$, the origin server creates a current time stamp $ST_1$, and stores it and $ST_0$ for use in subsequent (transmission delay) calculations described below (operation 74). In such calculations, a difference result obtained by subtracting $ST_0$ from $ST_1$, would be indicative of the "round trip" transmission delays incurred in transmission of the presently displayed page to the client and return transmission of $MSG_1$ from the client to the server.

Returning to consideration of client activities 63 occurring after formation of the display of the received page, the timing script prepares the client station to detect occurrence of one or more specific events relevant to use of the displayed page (detection action 80). Upon detection of a stipulated event, the timer started at 60 is stopped (action 81). The state of the timer counter at that instant, which represents the time elapsed since the page was received, is incorporated into a second message, $MSG_2$, which is transferred to the network addressed to the server (operation 82), and transmitted to the server over a variable route selected by processes 70–73.

Upon receiving $MSG_2$, the server performs operations 74 related to the contents of that message. These operations include creating and saving a time stamp $ST_2$, representing the server's time of reception of $MSG_2$. Differences between $ST_1$ and $ST_0$, and between $ST_2$ and the sum of $ST_0$ and ET, may be used to develop statistically relevant indications of round trip delays incurred by transmitted data and associated return messages, as well as indications of delays incurred only by transmitted data.

Relevant operations at the client station may either conclude after transmission of $MSG_2$, or as suggested at 90 and 91, may be followed by additional operations for detecting additional user actions or subsequent to the event giving rise to $MSG_2$. Each detection of such an additional event can be used to generate a corresponding message $MSG_n$ (n=3, 4, . . .) to be transmitted to the server and time stamped by the latter upon reception. As indicated at 90, the number of such operations can be determined by restricting n to a value "p" predefined in the timing script (where p is equal to or greater than 2, the initial value of n). As suggested at 91, when additional activities are monitored the value of n needs to be incremented and the timer stopped at 81 needs to be restarted.

It should be appreciated that time stamps resulting from handling of more than two return messages can be used—as in the foregoing discussion of the possible statistical treatment of time values ET, $ST_0$, $ST_1$, and $ST_2$—to develop additional statistically relevant indications of round trip delays as well as delays incurred only for data transmission. These indications can be used therefore to enhance the accuracy of average indications statistically inferred from time stamps applied to only two return messages.

3. Alternate Embodiments of the Invention

The following observations, although possibly having no direct relevance to the present invention, are considered noteworthy.

Since interpreters are not standard, it may be useful to transmit redundant versions of the timing script in script languages compatible with several popular interpreters.

Alternatively, the timing script could be provided in a preselected script language and transmitted along with an "applet" (mini-application) that: self installs at the client station; then executes automatically without dependence upon any program resident at that station; and ultimately is discarded after the associated data is discarded by the client station.

Other variations, for ensuring client execution of the timing script, should be readily apparent to those skilled in presently relevant arts.

Therefore, we claim:

1. For stations operating to exchange data through a non-synchronous data communication network, said network characterized in that data transmitted between said stations is subject to transmission delays of indeterminate duration within said network, apparatus for enabling a first station in said network to gather statistics indicative of durations of said transmission delays in respect to data transmitted through said network from said first station to a plurality of second stations remote from said first station, said apparatus comprising:

means at said first station for attaching control information to data instantly being transmitted from said first station to one of said second stations; said control information including a data identity (ID) associated with said data instantly being transmitted, a start time, $ST_0$, representing the time at which said first station began transmitting said data instantly being transmitted, and a timing script subject to interpretation at said one of said second stations; said timing script requiring said one of said second stations to immediately initiate transmission of a first return message to said first station upon receipt of said data instantly being transmitted; said first return message containing said data ID and said start time $ST_0$;

means at said first station for saving said start time $ST_0$ in association with said data ID;

means at said first station for generating a first time value $ST_1$ upon reception of said first return message at said first station; and means at said first station for saving said first time value in association with said saved start time value $ST_0$ and said saved data ID;

said saved time values being useful to develop round trip delay time information representing the aggregate transmission delays encountered by said data instantly being transmitted, en route between said first station and said one of said second stations, together with the aggregate transmission delay incurred by said first return message en route between said one of said second stations and said first station.

2. Apparatus in accordance with claim 1 wherein:

said data instantly being transmitted is susceptible of undergoing a predetermined user handling action at an indeterminate time after its reception at said one of said second stations receiving said data instantly being transmitted; and said timing script is effective to condition said one of said second stations to initiate transmittal of a second return message to said first station when a said predetermined user handling action occurs; said second return message containing said data ID and a time value ET internally developed at said one of said second stations; said time value ET representing the time elapsed between reception at said one of said second stations of said data instantly being transmitted and occurrence of said predetermined user handling action.

3. Apparatus in accordance with claim 2, wherein said first station comprises:

means effective upon reception of said second return message for saving said time value ET in association with said data ID and said saved time values $ST_0$ and $ST_1$;

means effective upon reception of said second return message for generating a second time value $ST_2$ at the respective time of reception of said second return message; and means for saving said second time value $ST_2$ in association with said other saved time values $ST_0$, $ST_1$ and ET;

all of said saved time values being useful together to develop delay time statistics indicative of the transmission delay encountered by said data instantly being transmitted en route from said first station to said one of said second stations.

4. Apparatus for a data server linked via a non-synchronous data communication network to client stations, said apparatus comprising:

means for attaching control information to respective data instantly being transmitted from said server to said network for transfer via said network to a said client station; said control information including a data identity (ID) associated with said data instantly being transmitted, a start time $ST_0$ representing the time at which said server started transmitting said respective data, and a timing script subject to interpretation at a client station receiving said respective data; said timing script requiring a client station receiving said respective data to immediately transmit a first return message to said network for transfer to said server; said first return message containing said data ID and said start time $ST_0$;

means for generating a time value $ST_1$ when said first return message is received at said server; and means for saving said value $ST_1$ in association with the data ID and start time value $ST_0$ contained in said first return message; said saved data ID and time values being useful to develop information about aggregate delays encountered by said respective data and said first return message in their passages through said network.

5. Apparatus according to claim 4 wherein said non-synchronous network is one in which transmitted data is subject to routing through variably selected switching nodes in said network and thereby subject to indeterminate transfer delays associated with said routing and queueing conditions encountered at individual switching nodes within a selected route; and wherein said saved ID and time values are useful to develop indications of said transfer delays.

6. Apparatus according to claim 4 wherein said attached timing script is further constructed to:

a) prepare said client station receiving said data instantly being transmitted to detect occurrence of a predetermined event which is subject to occurring at said client station at an indeterminate time after reception of said data instantly being transmitted; and b) condition said client station to send a second return message of predetermined form to said server upon detecting said predetermined event; said second message including said data ID and a time value ET internally developed at said client station; said time value ET representing time elapsed at said client station between reception of said data instantly being transmitted and detection of said predetermined event; and wherein said data server includes means for generating a second time value $ST_2$, when said second return message is received at said data server, and for saving said second time value in association with said saved data ID and said other saved time values ET, $ST_0$, and $ST_1$;

said saved second time value and said saved other time values being useful to develop statistically relevant indications of average transmission delays incurred in transmitting data from said server to said client stations.

7. A computer program product consisting of a program application for a data server linked via a non-synchronous network to client stations, said program application being conveyed to said data server via the computer readable medium and enabling said data server to develop statistically useful indications of delays incurred in transmitting data through said network to said client stations; said program application specifically causing said data server to:

attach control information to data instantly being transmitted from said data server to a said client station; said attached control information including: a data identity (ID) function uniquely associated with said data instantly being transmitted; a start time value $ST_0$, denoting the time at which said server began transmitting said data instantly being transmitted; and a timing script subject to interpretation at a client station receiving said data instantly being transmitted; said timing script being formed to cause said last-mentioned client station to immediately initiate transmission to said data server of a first return message having a predetermined form upon reception of said data instantly being transmitted; said first return message including said data ID and said start time value $ST_0$; and said program application is constructed to cause said first server, upon receiving said first return message to save said start time value $ST_0$, in association with said data ID, as a time statistic pertinent to determination of the transmission delay incurred by said data instantly being transmitted en route from said data server to said client station.

8. A computer program product in accordance with claim 7 wherein:

said timing script is additionally formed to:
  a) prepare said last-mentioned client station to detect occurrence of a predetermined event; said predetermined event being subject to occurrence at said client station at an indeterminate time after said data instantly being transmitted is received at said client station; and
  b) require said client station to initiate transmission of a second return message to said data server upon detection of said event; said second return message containing said data ID and a time value ET; said time ET being internally generated by said client station and representing the time elapsed at said client station between reception of said data instantly being transmitted and occurrence of said event; and said program application is constructed to cause said data server, upon reception of said second return message, to:
  a) generate a second time value $ST_1$ representing the time of said reception, and
  b) save said second time value and said elapsed time value ET in association with said data ID and said saved start time value $ST_0$;

said saved time values together providing a basis for deriving a statistically relevant indication of the transmission delay incurred by said data instantly being transmitted en route from said data server to said client station.

\* \* \* \* \*